US012566718B2

(12) United States Patent
Siluvainathan

(10) Patent No.: US 12,566,718 B2
(45) Date of Patent: Mar. 3, 2026

(54) CONFIGURING PCI EXPRESS MODULE USING HARDWARE IN A MEMORY SUB-SYSTEM

(71) Applicant: Micron Technology, Inc., Boise, ID (US)

(72) Inventor: Melky Arputharaja Siluvainathan, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 43 days.

(21) Appl. No.: 18/781,989

(22) Filed: Jul. 23, 2024

(65) Prior Publication Data

US 2025/0061065 A1     Feb. 20, 2025

Related U.S. Application Data

(60) Provisional application No. 63/532,611, filed on Aug. 14, 2023.

(51) Int. Cl.
| | |
|---|---|
| *G06F 9/4401* | (2018.01) |
| *G06F 13/00* | (2006.01) |
| *G06F 13/12* | (2006.01) |
| *G06F 13/16* | (2006.01) |
| *G06F 13/24* | (2006.01) |

(52) U.S. Cl.
CPC ............ *G06F 13/124* (2013.01); *G06F 13/24* (2013.01); *G06F 2213/0026* (2013.01)

(58) Field of Classification Search
CPC . G06F 13/124; G06F 13/24; G06F 2213/0026
See application file for complete search history.

(56) References Cited

U.S. PATENT DOCUMENTS

| | | | | |
|---|---|---|---|---|
| 5,655,147 | A * | 8/1997 | Stuber | G06F 13/124 710/7 |
| 2016/0210534 | A1* | 7/2016 | Padubrin | G06V 30/19127 |
| 2019/0034376 | A1* | 1/2019 | Das Sharma | G06F 12/1009 |
| 2021/0326433 | A1* | 10/2021 | Sly | G06N 3/0464 |
| 2022/0261357 | A1* | 8/2022 | Gabbai | G06F 12/126 |
| 2024/0103874 | A1* | 3/2024 | Soundararajan | G06F 9/30065 |
| 2025/0061065 | A1* | 2/2025 | Siluvainathan | G06F 13/124 |

* cited by examiner

*Primary Examiner* — Hyun Nam

(74) *Attorney, Agent, or Firm* — Lowenstein Sandler LLP

(57) ABSTRACT

A first set of parameter values are programed to a first set of sequencer registers. A second set of parameter values are programmed to a second set of sequencer registers. In response to a detecting a triggering event, a hardware sequencer performs the following operations: transfer the first set of parameter values from the first set of sequencer registers to a first set of link training registers, transfer the second set of parameter values from the second set of sequencer registers to a second set of link training registers, and initiate one end of a communication link training with a host.

20 Claims, 5 Drawing Sheets

Figure 3:
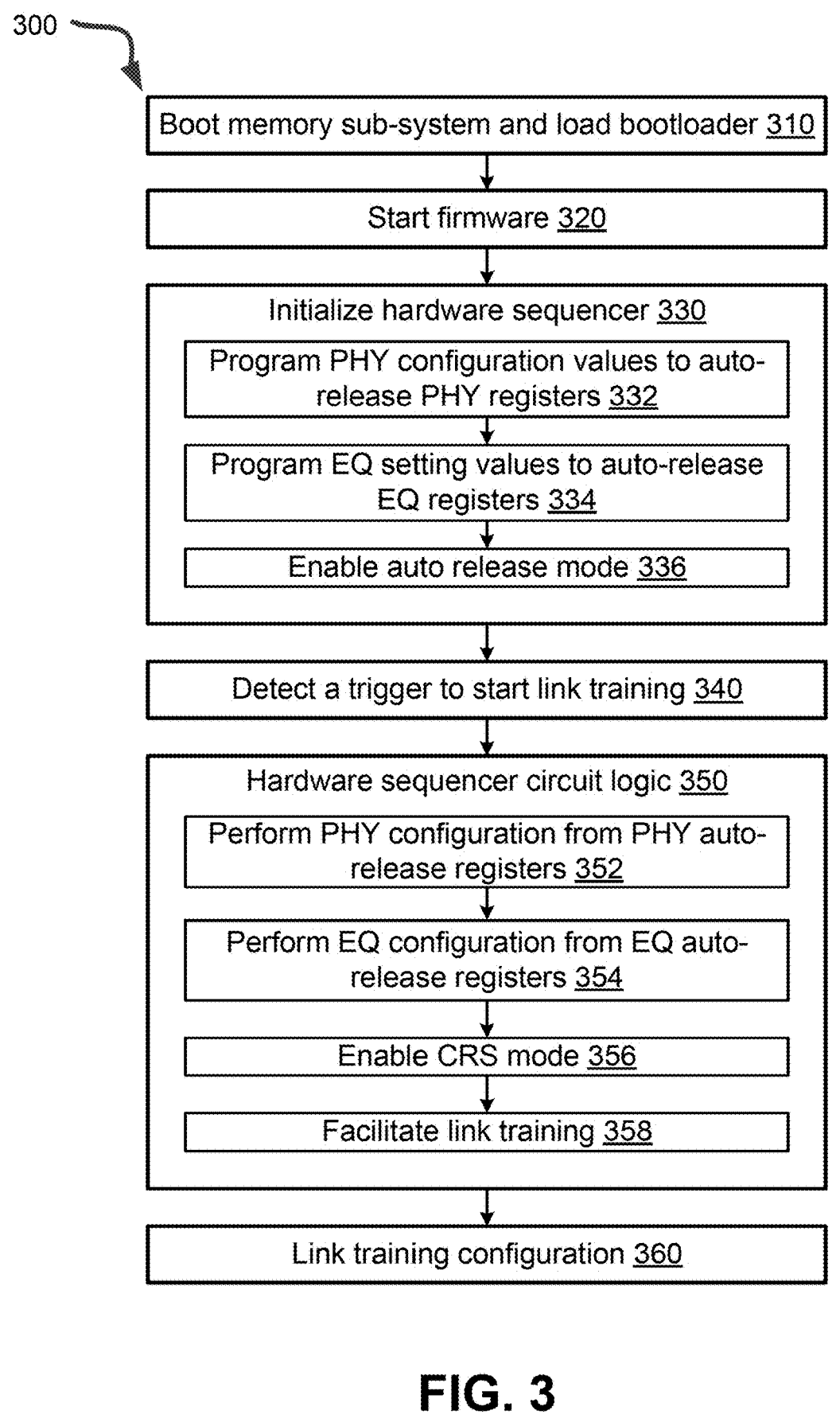

300

Boot memory sub-system and load bootloader 310

Start firmware 320

Initialize hardware sequencer 330

Program PHY configuration values to auto-release PHY registers 332

Program EQ setting values to auto-release EQ registers 334

Enable auto release mode 336

Detect a trigger to start link training 340

Hardware sequencer circuit logic 350

Perform PHY configuration from PHY auto-release registers 352

Perform EQ configuration from EQ auto-release registers 354

Enable CRS mode 356

Facilitate link training 358

Link training configuration 360

Programming a first set of configuration values to a first set of sequencer registers of the plurality of sequencer registers, and a second set of configuration values to a second set of sequencer registers of the plurality of sequencer registers 410

Responsive to detecting a triggering event, the hardware sequencer to perform operations comprising 420

Transferring the first set of configuration values from the first set of sequencer registers to a first set of link training registers of a plurality of link training registers of the memory sub-system 430

Transferring the second set of configuration values from the second set of sequencer registers to a second set of link training registers of the plurality of link training registers of the memory sub-system 440

Initiating one end of a communication link training 450

FIG. 4

CONFIGURING PCI EXPRESS MODULE USING HARDWARE IN A MEMORY SUB-SYSTEM

RELATED APPLICATION

This application claims the benefit of U.S. Provisional Application No. 63/532,611, filed Aug. 14, 2023, the entire contents of which are hereby incorporated by reference.

TECHNICAL FIELD

Embodiments of the disclosure relate generally to memory sub-systems, and more specifically, relate to configuring peripheral component interconnect express (PCI Express, or "PCIe") using hardware in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a flow diagram of an example method in accordance with some embodiments of the present disclosure.

FIG. 4 is a flow diagram of an example method in accordance with some embodiments of the present disclosure.

DETAILED DESCRIPTION

Figure 1:
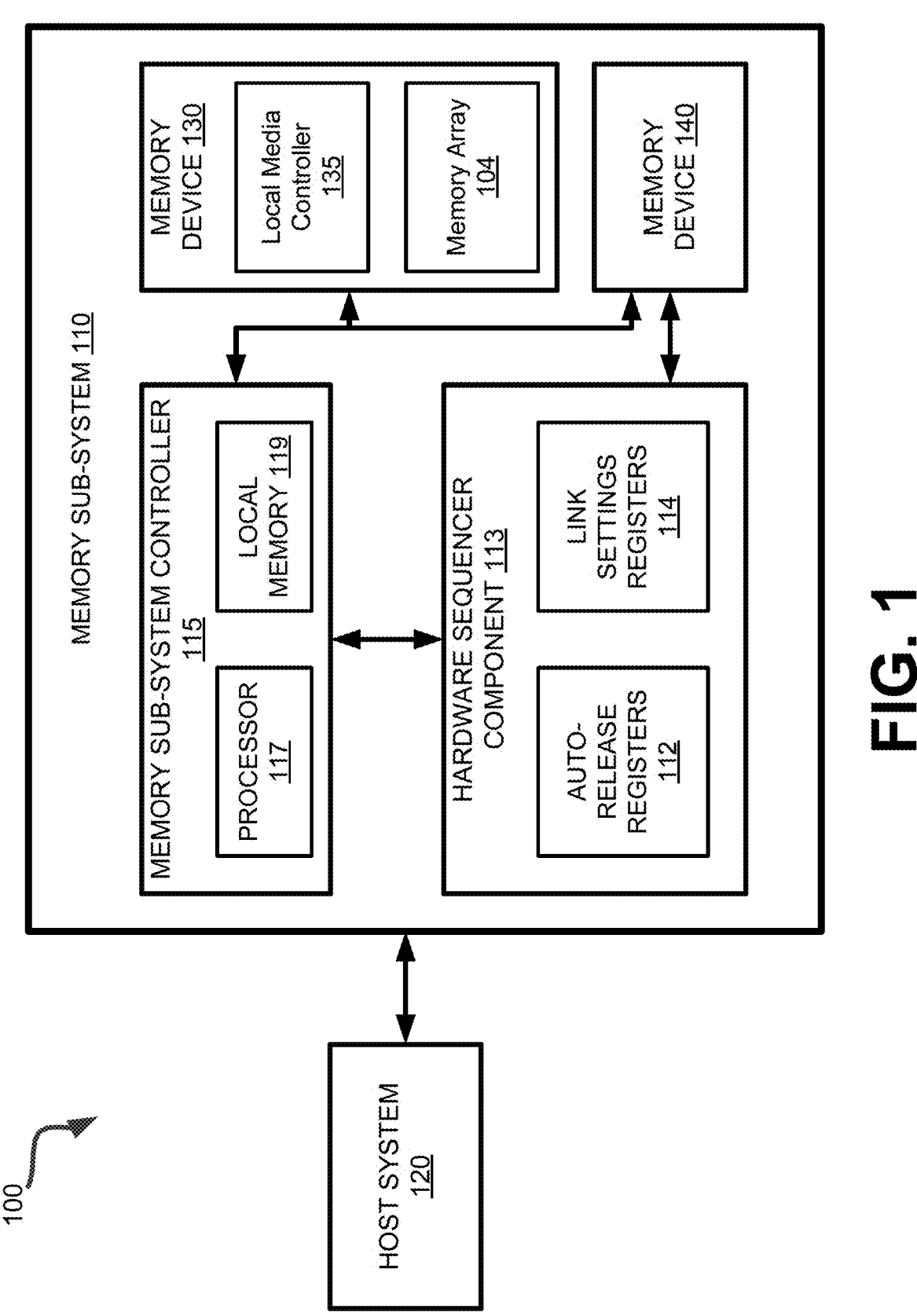
FIG. 1 illustrates an example computing system that includes a memory sub-system in accordance with some embodiments of the present disclosure.

Aspects of the present disclosure are directed to configuring peripheral component interconnect express (PCI Express, or "PCIe") on using hardware in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die may include one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can have a row of associated memory cells in a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For case of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

Compute Express Link (CXL) protocol is a high-speed interconnect standard that can enable communication between various components and/or systems. CXL can provide a low-latency, high-bandwidth interface that allows connected systems to share memory and perform common memory-mapped input/output (I/O) operations. When implemented in a memory sub-system, the CXL protocol can improve performance and reduce latency of the system. The CXL protocol supports multiple topologies, including point-to-point, switch-based, daisy-chain, etc. The CXL protocol can be implemented with various physical layer technologies such as PCI Express ("PCIe") and advanced chip-to-chip signaling. Implementing the CXL protocol across a PCI-E connection can introduce additional complexities related to requirements of the PCIe communications. CXL over PCIe can leverage the physical layer and electrical signaling of the PCIe specification while adding a CXL-specific protocol layer for higher-level functionality.

At the protocol layer, CXL adds a set of commands. The CXL protocol is highly sensitive to latency, and components or systems that improperly implement the CXL protocol can incur latency penalties which degrade or even prohibit the use of the CXL protocol. For example, CXL can allow devices to perform memory access operations (such as read or write operations) on memory regions that are owned by other systems. In this way, connected systems can share data, reduce expensive copies of data between systems, and improve allocation of physical memory. The CXL can include additional features for connected systems such as memory expansion (which can allow systems to extend memory capacity by accessing memory from connected systems), cache hints (which can allow systems to communicate cache state information to each other), data coherency (which can allow systems accessing a shared memory region to have a consistent view of memory), and various systems controls (which can allow systems to control and configure each other).

At the physical layer, the CXL protocol uses the PCIe physical layer to provide a high-speed, low-latency communication link between systems. For example, the PCIe 5.0 specification can allow a system to support a data rate of up to 32 GT/s per lane, which translates to a total bandwidth of up to 128 GB/s for a ×16 link. In some implementations, the CXL protocol can support link widths of ×2, ×4, and ×8, providing flexibility for different use cases. The PCIe specification defines a set of electrical characteristics (e.g., communication link configuration parameters) that are critical for communication between devices. These communication link configuration parameters can include, for example, requirements for signal levels, timing, jitter, etc. and are designed to facilitate accurate transmitting and receiving of signals across the PCIe interface. Signal level requirements include, for example, minimum and maximum voltages of the signal when transmitted and received. Signal level requirements can cover transmitted and receiver equalization, which compensates for signal level attenuation and/or distortion that can occur due to the characteristics of the communication medium. Timing requirements can be strict, and can include, for example, maximum rise and fall times, setup and hold times, clock-to-data skew, etc. Timing requirements can vary based on the application and version of the PCIe specification. Jitter can refer to variation in timing of signals (e.g., clock signals, data signals) due to noise and other disruptions. The PCIe specification includes provisions for jitter testing and mitigation, including specifying maximum jitter values for signals and requiring devices to be tested for jitter tolerance.

Communication between two systems based on the PCIe specification can be achieved with a communication link across a PCIe interface. "Communication link training" can refer to a process undergone by two systems (e.g., a host and a client) that are establishing a communication link over the PCIe physical layer. Communication link training can establish a reliable, high-speed communication link between systems, and can take into consideration the characteristics of each system, the characteristics of the communication medium, and other factors that can affect the quality of the link. Communication link training can include initialization, idle detection, idle insertion, equalization, negotiation, and verification. During initialization, systems exchange predetermined sequences to initiate a basic communication link. This basic communication link can allow the systems to exchange data at a low data rate and can allow the systems to establish a common reference point for further communications (e.g., by allowing systems to synchronize their respective clocks, etc.). During idle detection, the systems can detect when the communication link is in an idle state (i.e., when there is no data being transmitted on the link). Detecting the idles state can allow the systems to synchronize their respective timing and clocks. During idle insertion, each system can insert an idle pattern onto the basic communication link. Each system can use the respectively received idle pattern detect problems with the communication link, such as impedance mismatches or other electrical issues. During equalization, the systems can compensate for signal attenuation or distortion that can occur due to operating conditions and/or characteristics of the communication medium. Equalization can include adjusting the voltage levels and timing of the signals to improve the accuracy of the transmitted signals. During negotiation, the systems can negotiate various communication link parameters, such as the data rate, lane count, encoding scheme, etc., to maximize the speed and efficiency of the communication link. Once the negotiation is complete, the systems can perform a final check to verify that the link is operating correctly. During verification, the systems can exchange test patterns to confirm that each system is correctly receiving the test patterns at the other end of the link.

After communication link training has completed, a client can enable a configuration request retry status (CRS) handling mode. CRS handling mode can allow a client to notify the host that the client is not ready to provide configuration values. When CRS handling mode is enabled, the client can indicate to the host to try the configuration request again. In some embodiments, when the CRS handling mode is enabled, the client can also provide the host with the updated parameter values, and the host can retry the configuration request using the updated parameter values. The CRS handling mode can be enabled for the client (e.g., the memory sub-system) until the configuration is successful, until a certain amount of time has elapsed, for a certain number of updated requests, etc., or until otherwise disabled by the client. In some embodiments, when a configuration request fails, or is not completed successfully, a client can enable a configuration request retry status (CRS) handling mode.

As discussed above, the PCIe specification includes strict timing requirements for signals, such as maximum rise and fall times, setup and hold times, clock-to-data skew, etc. These requirements are designed to ensure that signals are accurately sampled, and that data is transmitted and received correctly. In the PCIe 5.0 specification, one timing requirement is that a PCIe system should start participating in communication link training within 20 milliseconds after receiving a PCIe reset signal. The PCIe 5.0 specification permits a maximum clock stability time (e.g., waiting period to reduce jitter) of 100 milliseconds in certain situations (e.g., during a cold boot), but in some implementations, even with the additional clock stability time, it can be difficult or not feasible for a PCIe system to respond within the set time period. For example, in some implementations participating in communication link training can require a system to reset and program its respective PCIe parameter values, which can be difficult to achieve within the required 20 ms, or even 120 ms. Participation in communication link training requires configuration parameter values for the communication link. For PCIe, these configuration parameters can include a physical layer (PHY) parameter, and an equalization settings (EQ) parameter. PHY parameter values for a respective system can be compensations for the physical aspects of the system. These physical aspects can include trace lengths, electrical component types, manufacturing processes/defects, electrical characteristics etc. EQ parameter values for a respective system can be compensations for the communication link medium between the PCIe systems, including compensations for characteristics of the component which enables the communication link (e.g., an electrical connector, socket, transceiver, etc.). EQ parameter values can be based on the properties of the signal received across the communication link, including the strength (e.g., power) of the signal, the phase of the signal, the distortion of the signal, the voltage of the signal, the frequency of the signal, etc. EQ parameter values can also be based on the physical layer that connects the communication medium (e.g., the electrical connector) to the respective system. Configuration parameter values for the memory sub-system (i.e., PHY parameter values and EQ parameter values) can be adjusted based on characteristics of the memory sub-system, as well as characteristics of a respective communicating system. In some implementations these configuration values can be adjusted during production of the memory sub-system. In some implementations, these configuration values can be adjusted by the controller of the memory sub-system. In some implementations, using firmware, PCIe parameter values can be customized for each system to which a memory sub-system is connected. However, as noted above, both the CXL and PCIe protocols have strict timing/latency requirements, and in some implementations, the memory sub-system controller and corresponding firmware might be unable to comply with the strict timing requirements.

Aspects of the present disclosure address the above and other deficiencies by providing a memory sub-system that initiates, using a hardware sequencer, a portion of the PCIe link training process. The controller can program parameter values to registers of the hardware sequencer. When a triggering event is detected (e.g., when an auto-release mode is enabled), the hardware sequencer can transfer the parameter values from the registers to link training registers. Subsequently, the hardware sequencer can participate in communication link training with an external device (e.g., a host device). In some embodiments, a configuration mode can be enabled that allows the hardware sequencer to provide parameter values to the external device. In some embodiments, the configuration mode can permit the external device to read values from the link training registers. The hardware sequencer can then participate in one end of communication link training. In some implementations, the hardware sequencer can initiate the configuration of the PCIe communication link responsive to an event such as a PCIe reset. In response to a request to begin link training, the controller can enable an auto release mode of the hardware sequencer. The hardware sequencer can then, independent of the controller, set the PHY parameter values and the EQ parameter values needed for the link training, and subsequently perform one side of the link training.

In some implementations, the controller can initialize the hardware sequencer with PHY parameter values and EQ parameter values faster than the controller can perform the link training. After initializing the hardware sequencer, the controller can perform other operations for the memory sub-system, such as boot operations, firmware operations, memory access operations, etc. In this way, the number of time-sensitive operations the controller has to perform, or be ready to perform—sometimes during critical performance periods of the memory sub-system, such as during startup, or during a firmware upgrade—can be reduced. Additionally, by initiating the hardware sequencer and then relying on the hardware sequencer to perform the link training, the controller does not have to wait for a link training request and once the request is received, interrupt other processes to participate in the link training. This permits timing flexibility for the controller which can perform a preparatory portion of the communication link training (i.e., initializing the hardware sequencer with the respective values) at any time before the communication link training request is received. Further details regarding the hardware sequencer are described below.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a hardware sequencer component 113 that can perform at least a part of client-side communication link training between the memory sub-system 110 and external systems, such as host system 120. In some embodiments, memory sub-system 110 can be connected to an external system such as host system 120 to provide additional resources and/or capabilities to the host system 120. As described above, in order for the host system 120 to utilize the resources of memory sub-system 110, host system 120 and memory sub-system need to establish a communication link. As used herein, "client" communication link training can refer to the portion of communication link training that is performed by a system such as memory sub-system 110. In contrast, "host-side" communication link training can refer to the portion of communication link training that is performed by an external system such as a host. The parameters of the communication link can be different for each system (e.g., host system 120, memory sub-system 110, etc.) and can depend on the physical structure of the system, operating conditions, and/or manufacturing processes for the respective system(s). Establishing the communication link through communication link training can be accomplished using the communication link parameters that correspond to a respective system. In some embodiments, memory sub-system controller 115 can initialize the hardware sequencer component 113 in preparation for client-side communication link training. In some embodiments, a portion of memory sub-system controller 115 can be dedicated to causing hardware sequencer component 113 to perform at least part of client-side communication link training.

Hardware sequencer component 113 can include auto-release registers 112 and link setting registers 114. Auto-release registers 112 can be initialized with values by the hardware sequencer component 113. In some embodiments, a controller, such as memory sub-system controller 115 or local media controller 135 can cause the hardware sequencer component 113 to populate auto-release registers 112 with certain values. Link setting registers 114 can be populated with values from the auto-release registers 112. Auto-release registers 112 can be designed to release stored values based on a trigger event, such as the satisfaction of a threshold, the value of a stored indicator, etc. When the auto-release registers 112 release, hardware sequencer component 113 can cause the stored values from auto-release registers 112 to be transferred to link setting registers 114. The values of link setting registers 114 can be made available to an external system such as host system 120. In this way, the link setting registers 114 can contribute to client-side communication link training (i.e., the part of communication link training for which the memory sub-system 110 is responsible). In some embodiments, the memory sub-system controller 115 can include a portion of the hardware sequencer component 113. In some embodiments, local media controller 135 can cause the hardware sequencer component 113 to perform at least part of client-side communication link training. In some embodiments, local media controller 135 can include a portion of hardware sequencer component 113.

After an initialization, hardware sequencer component 113 can operate independent of memory sub-system controller 115. In some embodiments, memory sub-system controller 115 can initialize hardware sequencer component 113. In some embodiments, hardware sequencer component 113 can be initialized responsive to the memory sub-system being powered on. In some embodiments, hardware sequencer component 113 can be initialized responsive to memory sub-system 110 being connected to an external system, such as host system 120. For example, if memory sub-system 110 is connected to host system 120 by a PCIe interface (e.g., PCIe 5.0), hardware sequencer component 113 can be initialized responsive to memory sub-system 110 being properly seated in a PCIe interface connector. Hardware sequencer component 113 and memory sub-system controller can perform operations in parallel. Hardware sequencer component 113 and memory sub-system controller can each contribute to client-side communication link training for memory sub-system 110. Hardware sequencer component 113 can initiate the process of the communication link training on the side of the memory sub-system. Memory sub-system controller 115 can continue the client-side communication link training operations for the memory sub-system 110 that were initiated by hardware sequencer component 113. In some embodiments, memory sub-system controller 115 can take control of the client-side communication link training operations for the memory sub-system 110 at any time. In some embodiments, memory sub-system controller 115 and hardware sequencer component 113 can simultaneously contribute to client-side communication link training.

Figure 2:
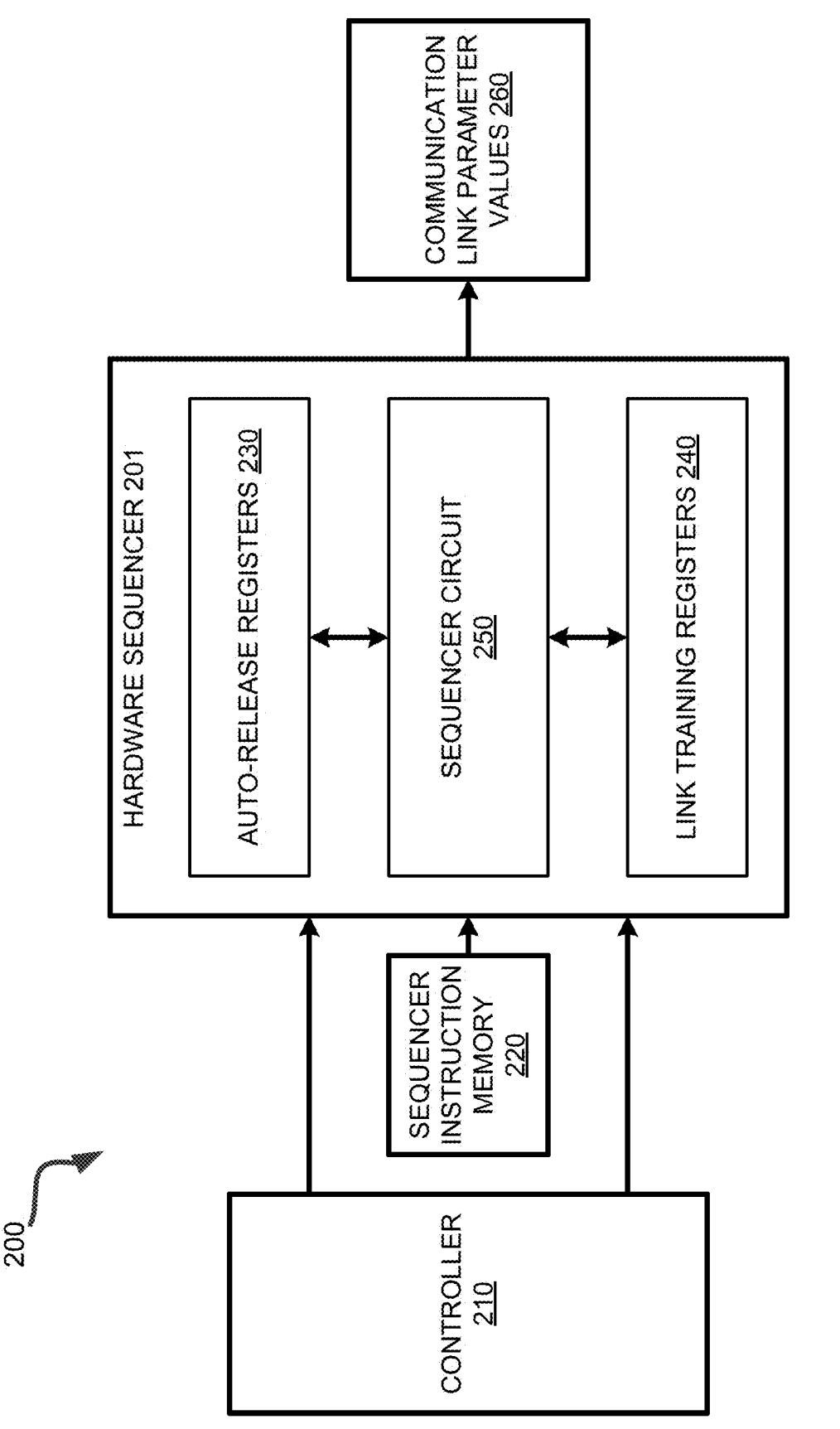
FIG. 2 illustrates an example of hardware implementation of a memory sub-system with a hardware sequencer.

FIG. 2 illustrates an example of hardware implementation 200 of a hardware sequencer 201 with a memory sub-system, such as memory sub-system 110 as described with respect to FIG. 1. In some embodiments, hardware sequencer 201 can be a part of a hardware sequencer component, such as hardware sequencer component 113 as described with respect to FIG. 1. Hardware implementation 200 includes controller 210, sequencer instruction memory 220, auto-release registers 230, link training registers 240, and sequencer circuit 250. The output from hardware implementation 200 in this illustrative example is represented as communication link parameter values 260. Hardware implementation 200 can illustrate the connections and functions of illustrative component blocks without respect for the physical or logical location of each illustrative component block. For example, in some embodiments, hardware sequencer 201 does not include link training registers 240. Link training registers 240 will operate the as described below whether part of hardware sequencer 201, part of another component, or a separate component of the memory sub-system. No matter the physical location of the illustrative block component(s), the hardware implementation 200 of hardware sequencer 201 and a memory sub-system can produce, or contribute to producing the communication link parameter values 260.

Hardware sequencer 201 can perform at least part of client-side communication link training. Hardware sequencer 201 can include auto-release registers 230, link training registers 240, and sequencer circuit 250. In some embodiments, hardware sequencer 201 can include fewer block components than illustratively demonstrated by FIG. 2. For example, hardware sequencer 201 might include auto-release registers 230 and sequencer circuit 250, but not link training registers 240. In some embodiments, hardware sequencer 201 can include more block components than is illustratively demonstrated by FIG. 2. For example, hardware sequencer 201 might include auto-release registers 230, link training registers 240, sequencer circuit 250, and sequencer instruction memory 220. In some embodiments, hardware sequencer 201 can produce communication link parameter values 260.

Controller 210 can cause the hardware sequencer 201 to perform certain actions. In some embodiments, the controller can cause other illustrative component blocks of FIG. 2 (e.g., auto-release registers 230, link training registers 240, sequencer circuit 250, etc.) to perform certain actions. Controller 210 can initialize hardware sequencer 201. In some embodiments, controller 210 can initialize sequencer circuit 250. In some embodiments, controller 210 can initialize auto-release registers 230 and/or link training registers 240. In some embodiments, controller 210 can configure the sequencer circuit 250. In some embodiments, controller 210 can be a controller such as memory sub-system controller 115, or local media controller 135 as described with respect to FIG. 1.

Sequencer instruction memory 220 can provide the hardware sequencer 201 with initialization values for the communication link training. Sequencer instruction memory 220 can be used in conjunction with controller 210 to initialize hardware sequencer 201. In some embodiments, sequencer instruction memory 220 can be a part of controller 210 as local memory (e.g., such as local memory 119 of memory sub-system controller 115). Values for sequencer instruction memory 220 can be stored as metadata in a corresponding data structure. Sequencer instruction memory 220 can include initialization settings for hardware sequencer 201. In some embodiments, sequencer instruction memory 220 can include initialization settings for auto-release registers 230, link training registers 240, and/or sequencer circuit 250. In some embodiments, sequencer instruction memory 220 can include parameter values corresponding to the client (e.g., the memory sub-system 110) communication link training. In some embodiments, sequencer instruction memory 220 can include instruction sets to be performed by a controller (such as controller 210) in response to actions performed by sequencer circuit 250. For example, responsive to detecting the triggering event which causes auto-release registers 230 to release respectively stored values, sequencer instruction memory 220 can include instruction sets which cause the controller 210 and/or hardware sequencer 201 to enable a configuration mode that permits an external system (e.g., a host system such as host system 120 as described with respect to FIG. 1) to communication link parameter values 260 from the memory sub-system (e.g., memory sub-system 110).

Auto-release registers 230 can be initialized with parameter values corresponding to the system (e.g., the memory sub-system 110). In response to a triggering event, auto-release registers can release the stored parameter values. In some embodiments, sequencer circuit 250 can determine where the stored parameter values are released. In some embodiments, the stored parameter values are released to link training registers 240. Auto-release registers 230 can include registers which correspond to various link training parameters. In some embodiments, auto-release registers 230 can include registers to store PHY parameter values. In some embodiments, auto-release registers 230 can include registers to store EQ parameter values.

Link training registers 240 can include multiple sets of link training registers. In some embodiments, link training registers 240 can be initialized preparatory to receiving values from auto-release registers 230. In some embodiments, sequencer circuit 250 can determine the location from which link training registers 240 receive stored parameter values. In some embodiments, link training registers 240 can include registers to receive PHY parameter values. In some embodiments, link training registers 240 can include registers to receive EQ parameter values. In some embodiments, communication link parameter values 260 can be the values received by and subsequently stored by link training registers 240.

Sequencer circuit 250 can include AND gates, OR gates, etc., flip flops, registers, etc., and various combinations of such hardware components. In some embodiments, sequencer circuit 250 can include configurable circuit logic such as, for example, field programmable gate arrays (FP-GAs). In some embodiments, sequencer circuit 250 can initialize, or cause to be initialized, auto-release registers 230. In some embodiments, sequencer circuit 250 can include traces which connect auto-release registers 230 to link training registers 240. In some embodiments, sequencer circuit 250 can perform hardware-based transforms on values released from auto-release registers 230 before allowing those values to be received (e.g., stored) in link training registers 240. In some embodiments, sequencer circuit 250 can perform hardware-based transforms on values stored in link training registers 240.

Communication link parameter values 260 can include client-based parameter values for initiating and establishing a communication link between two systems (e.g., between memory sub-system 110 and host system 120). In some embodiments, values received and subsequently stored in link training registers 240 can be communication link parameter values. In some embodiments, communication link parameter values 260 can be hardware-based transforms of values stored in link training registers 240. Communication link parameter values 260 can be stored in a data structure of memory sub-system 110. When a certain mode is enabled for the memory sub-system 110, communication link parameter values 260 can be read by the host system. In some embodiments, the certain mode permits the host system 120 to read values stored in link training registers 240.

FIG. 3 is a flow diagram of an example method 300 in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the hardware sequencer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the memory sub-system begins to boot, and the controller implementing the method 300 loads the bootloader. As described above, the PCIe 5.0 specification can require a PCIe system to start participating in communication link training within 20 milliseconds after receiving a PCIe reset signal. The PCIe specification allows a maximum clock stable time of 100 milliseconds, and the required signals can be sent from the PCIe system after the clock has stabilized. In some embodiments, the controller can load the bootloader and subsequently start the firmware (as in operation 320) while complying with the PCIe 5.0 specification timing for communication link training.

At operation 320, the controller starts the firmware. The firmware can allow the controller to manage the resources of the memory sub-system and interface with an external system. In some embodiments, operation 320 can be performed after operation 330.

At operation 330, the controller initializes the hardware sequencer (such as hardware sequencer 201 as described with respect to FIG. 2). The controller can offload certain aspects of PCIe communication link training to the hardware sequencer. In this way, the controller can load the bootloader and start the firmware with minimal interruptions while the hardware sequencer manages some aspects of the communication link training process. The controller can initialize the hardware sequencer with client parameter values (e.g., PHY values, EQ parameter values, etc.) that impact the communication link training process. The hardware sequencer can be configured to respond to a link training trigger. In response to the link training trigger, the hardware sequencer can perform various hardware operations, which are further described below with respect to operation 350. In some embodiments, the hardware sequencer can respond to a link training trigger when operating in a certain mode. In some embodiments, when a reset signal is detected, the hardware sequencer can be prepared to respond to a link training trigger.

As a part of operation 330, at operation 332, the controller programs a PHY parameter value to an auto-release PHY register. In some embodiments, multiple PHY parameter values can be programmed to the PHY registers. As described above, PHY parameter values can be affected by physical aspects of the respective system (e.g., the memory sub-system) including trace lengths, electrical component types, manufacturing processes/defects, other electrical characteristics of the respective system, etc. Although PHY parameter values are shown in this illustrative example, these labels are only used for exemplary purpose and it should be understood that any communication link training parameter value for the memory sub-system (e.g., memory sub-system 110 as described with respect to FIG. 1) can be programed to respective registers.

As a part of operation 330, at operation 334, the controller programs an EQ parameter value to an auto-release EQ register. In some embodiments, multiple EQ parameter values can be programmed to the EQ registers. As described above, EQ parameter values are affected by properties of the received signal across the communication link including the power, phase, distortion, frequency, voltage, etc. of the signal. EQ parameter values can also be affected by the physical interface between the communication medium (e.g., the electrical connector) and the rest of the respective system (e.g., the memory sub-system). Although EQ parameter values are shown in this illustrative example, these labels are only used for exemplary purpose and it should be understood that any communication link training parameter value for the memory sub-system (e.g., memory sub-system 110 as described with respect to FIG. 1) can be programed to respective registers. In some embodiments, additional communication link training parameter values can be programmed to additional respective registers.

In some embodiments, the initialized parameter values (e.g., the PHY parameter values, the EQ parameter values, etc.) can be approximate values. During communication link training, the two systems perform various operations to optimize the communication link between these systems. As a part of these operations, parameter values for each system can be updated to improve the quality of the link. For example, a link can be initiated, but due to inaccurate, or non-optimized parameter values for either one of the two systems, the quality of the communication link might be poor (e.g., can be slow, have high latency, low bandwidth, etc.). While a poor quality communication link can degrade operations between the systems if not improved, the poor quality communication link is sufficient for the respective systems to perform communication link training. Communication link training can improve the quality of the communication link such that the communication link can then perform to a specified level (e.g., the communication link can conform with various industry standards or protocols such as PCIe 5.0, CXL, etc.). Thus, in some embodiments, the parameter values stored in the hardware sequencer and accessed by the external system to initiate communication link training can be good enough to initiate communication link training. After the communication link training has been initiated, the controller can reengage in the communication link training and optimize or correct the memory sub-system parameter values as needed to improve the communication link.

As a part of operation 330, at operation 336, responsive to completing both operation 332 and operation 334, the controller enables an auto-release mode. In some embodiments, the auto-release mode can be triggered by a port reset of the memory sub-system. A port reset can occur when the memory sub-system is powered off and then back on. For example, to upgrade firmware on the memory sub-system, various components of the memory sub-system controller can be power cycled. This process can trigger a port reset. In some embodiments, the auto-release mode can be triggered by other events. For example, during a cold boot the memory sub-system controller can perform multiple functions as quickly as possible to minimize downtime or latency that might be experienced by a host system. The functions can be required by the memory sub-system so that the memory sub-system can perform memory access operations, independent of the memory sub-system's ability to communicate with the host system. As described above, because various industry specifications and protocols (e.g., PCIe 5.0, CXL, etc.) can have strict communication link training timing requirements, in some embodiments, a cold boot can trigger the hardware sequencer to perform its operations. In some embodiments, the controller can configure what will trigger the auto-release mode. In some embodiments, the auto-release mode can be triggered responsive to the controller (or hardware sequencer) detecting a certain value of a stored flag (e.g., a port reset flag, a cold boot flag, etc.). In some embodiments, the auto-release mode can be triggered responsive to the controller (or hardware sequencer) detecting a change in value of the stored flag.

At operation 340, the controller detects a link training trigger. In some embodiments, detecting the link training trigger is performed by the hardware sequencer. In some embodiments, the hardware sequencer can be triggered by the controller. In some embodiments, the hardware sequencer can be triggered by a signal from an external system (e.g., such as host system 120 as described with respect to FIG. 1). In some embodiments, the link training trigger can be a request from an external system (e.g., host system 120) to start link training.

At operation 350, the hardware sequencer performs the hardware sequencer circuit logic. As described above with reference to FIG. 1 and FIG. 2, the hardware sequencer can release initialized values from auto-release registers to link training registers. In some embodiments, the hardware sequencer can include additional hardware logic which can perform hardware-based transforms on the values initially stored in the auto-release registers and/or the values received and subsequently stored in the link training registers. In some embodiments, the hardware sequencer can perform transformations on these values between the time the values are released from the auto-release registers and the time that these values are received by the link training registers. In some embodiments, hardware sequencer can include a hardware data structure (e.g., additional registers, latches, flip-flops, etc.) in addition to the auto-release registers and the link training registers.

As a part of operation 350, at operation 352, the hardware sequencer performs the PHY configuration from the PHY duplicate registers. In some embodiments, performing the PHY configuration can include causing the stored values of the PHY registers to be released to respective link training registers, as described with respect to FIG. 2. Although a PHY configuration with PHY parameter values are shown in this illustrative example, these labels are only used for exemplary purpose and it should be understood that any communication link training parameter configuration for the memory sub-system (e.g., memory sub-system 110 as described with respect to FIG. 1) can be performed with respective registers. In some embodiments, the PHY registers of operation 352 can be auto-release PHY registers (e.g., registers that release in response to a triggering event, value, etc.).

As a part of operation 350, at operation 354, the hardware sequencer performs the EQ configuration from the EQ registers. In some embodiments, performing the EQ configuration can include causing the stored values of the auto-release EQ registers to be released to respective EQ link training registers, as described with respect to FIG. 2. Although an EQ configuration with EQ parameter values are shown in this illustrative example, these labels are only used for exemplary purpose and it should be understood that any communication link training parameter configuration for the memory sub-system (e.g., memory sub-system 110 as described with respect to FIG. 1) can be performed with respective registers. In some embodiments, the EQ registers of operation 354 can be auto-release EQ registers (e.g., registers that release in response to a triggering event, value, etc.). In some embodiments, additional communication link training parameter configurations can be performed with additional respective registers.

As a part of operation 350, at operation 356, responsive to completing both operation 352 and operation 354, the hardware sequencer enables a configuration request retry status (CRS) handling mode for the memory sub-system. As described above, when enabled, the CRS handling mode can allow a client (i.e., the memory sub-system) to initiate a configuration request with the host using a different set of parameter values. The hardware sequencer can be configured to initiate the configuration request with the host using the values stored in the PHY and EQ link training registers. In some embodiments, with the CRS handling mode enabled, the hardware sequencer can provide the host with parameter values. In some embodiments, the host can be permitted to obtain the parameter values by reading the values from a designated area of the memory sub-system. In some embodiments, once the host has the parameter values from the link training registers, the host can retry the configuration request using the parameter values from the link training registers. In some embodiments, this designated area can include PHY and EQ link training registers which, as described above with respect to FIG. 2, have received PHY and EQ parameter values from auto-released PHY and EQ registers respectively.

As a part of operation 350, at operation 358, the hardware sequencer facilitates communication link training. The hardware sequencer can perform client operations for communication link training, responsive to receiving requests from the host system (e.g., such as host system 120).

At operation 360, the hardware sequencer configures link training. In some embodiments, the hardware sequencer initiates the client-side communication link training. In some embodiments, the controller configures the link training. In some embodiments, subsequent to the hardware sequencer initiating the link training, the controller continues to perform the link training. The hardware sequencer can trigger the memory sub-system to enter a certain mode which permits an external system (e.g., host system 120) to read values from certain areas of the memory sub-system (e.g., the link training registers of the hardware sequencer). The client link training requires parameter values corresponding to physical aspects of the system (e.g., the memory sub-system), and these are the values which can be stored in link training registers. In some embodiments, by making the corresponding parameter values available to the external system, the hardware sequencer can initiate client operations for the communication link training.

FIG. 4 is a flow diagram of an example method 400 in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the hardware sequencer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the controller implementing the method 400 programs a first set of parameter values to a first set of sequencer registers of the plurality of sequencer registers, and a second set of parameter values to a second set of sequencer registers of the plurality of sequencer registers. In some embodiments, the hardware sequencer (e.g., such as hardware sequencer 201 as described with respect to FIG. 2) can include the plurality of sequencer registers.

At operation 420, responsive to detecting a triggering event, the hardware sequencer performs the following operations. The triggering event can include a request from the host to begin a link training. In some embodiments, the controller can trigger the hardware sequencer's auto-trigger mode. In some embodiments, detecting the triggering event can include enabling an auto-release mode of the hardware sequencer. The auto-release mode can cause the hardware sequencer to perform operations responsive to a link training request. In some embodiments receiving the link training request can trigger the auto-release mode.

At operation 430, the hardware sequencer transfers the first set of parameter values from the first set of sequencer registers to a first set of link training registers of a plurality of link training registers of the memory sub-system. In some embodiments, first set of parameter values can include values of a PHY parameter.

At operation 440, the hardware sequencer transfers the second set of parameter values from the second set of sequencer registers to a second set of link training registers of the plurality of link training registers of the memory sub-system. In some embodiments, the second set of parameter values can include values of an EQ parameter.

In some embodiments, the initialized parameter values (e.g., the PHY parameter values, the EQ parameter values, etc.) can be approximate values. During communication link training, the two systems perform various operations to optimize the communication link between these systems. As a part of these operations, parameter values for each can be updated to improve the quality of the link. For example, a link can be initiated, but due to inaccurate, or non-optimized parameter values for either one of the two systems, the quality of the communication link might be poor (e.g., can be slow, have high latency, low bandwidth, etc.). While a poor quality communication link can degrade operations between the systems if not improved, the poor quality communication link is sufficient for the respective/systems to perform communication link training. Communication link training can improve the quality of the communication link such that the communication link can then perform to a specified level (e.g., the communication link can conform with various industry standards or protocols such as PCIe 5.0, CXL, etc.). Thus, in some embodiments, the parameter values stored in the hardware sequencer and accessed by the external system to initiate communication link training can be good enough to initiate communication link training. After the communication link training has been initiated, the controller can reengage in the communication link training and optimize or correct the memory sub-system parameter values as needed to improve the communication link.

In some embodiments, the hardware sequencer can enable a configuration mode of the memory sub-system. The configuration mode can permit a host to obtain data from the plurality of link training registers. The configuration mode can enable further configuration of an initially established communication link. In some embodiments, the configuration mode of the memory sub-system can include a configuration request retry status (CRS) handling mode. As described above, when enabled, the CRS handling mode can allow a client (i.e., the memory sub-system) to notify the host that the client is not ready to provide configuration values. The client can indicate that the host should try the configuration request again. In some embodiments, the client can indicate the host should initiate a configuration request using a different set of parameter values. The hardware sequencer can be configured to provide the parameter values to the host using the PHY link training registers and the EQ link training registers. In some embodiments, the host can be permitted to obtain the parameter values by reading the values from a designated area of the memory sub-system. In some embodiments, once the host has the parameter values from the link training registers, the host can retry the configuration request using the parameter values from the link training registers.

At operation 450, the hardware sequencer initiates one end of communication link training. The link training operation can be controlled by an external system such as a host system. In some embodiments, enabling the configuration mode of the memory sub-system can allow the hardware sequencer to initiate the client-side (e.g., the memory sub-system's portion) of the communication link training. In some embodiments, the host system can obtain parameter values from the memory sub-system and use the read parameter values to perform the communication link training. Values made available by the hardware sequencer to the host system for communication link training can be preliminary values that are good enough to establish a basic communication link. In some embodiments, these preliminary values might not be optimized for the best performance of the communication link. After the hardware sequencer initiates the communication link training (e.g., the memory sub-system side), the controller can reengage in communication link training.

In some embodiments, after the communication link training has been initiated, the controller can disable the configuration mode of the memory sub-system. In some embodiments, after the communication link training has been initiated, the controller can receive a link training interrupt. Responsive to receiving the training link interrupt, the controller can perform a peripheral component interconnect express (PCIe) configuration update. Responsive to receiving the training link interrupt, the controller can perform a compute express link (CXL) configuration update. In some embodiments, the PCIe configuration update and CXL configuration update are performed simultaneously. In some embodiments, after the communication link training has been completed, the controller can enable an operating mode of the memory sub-system. The operating mode of the memory sub-system can permit the host to enumerate the memory sub-system.

Figure 5:
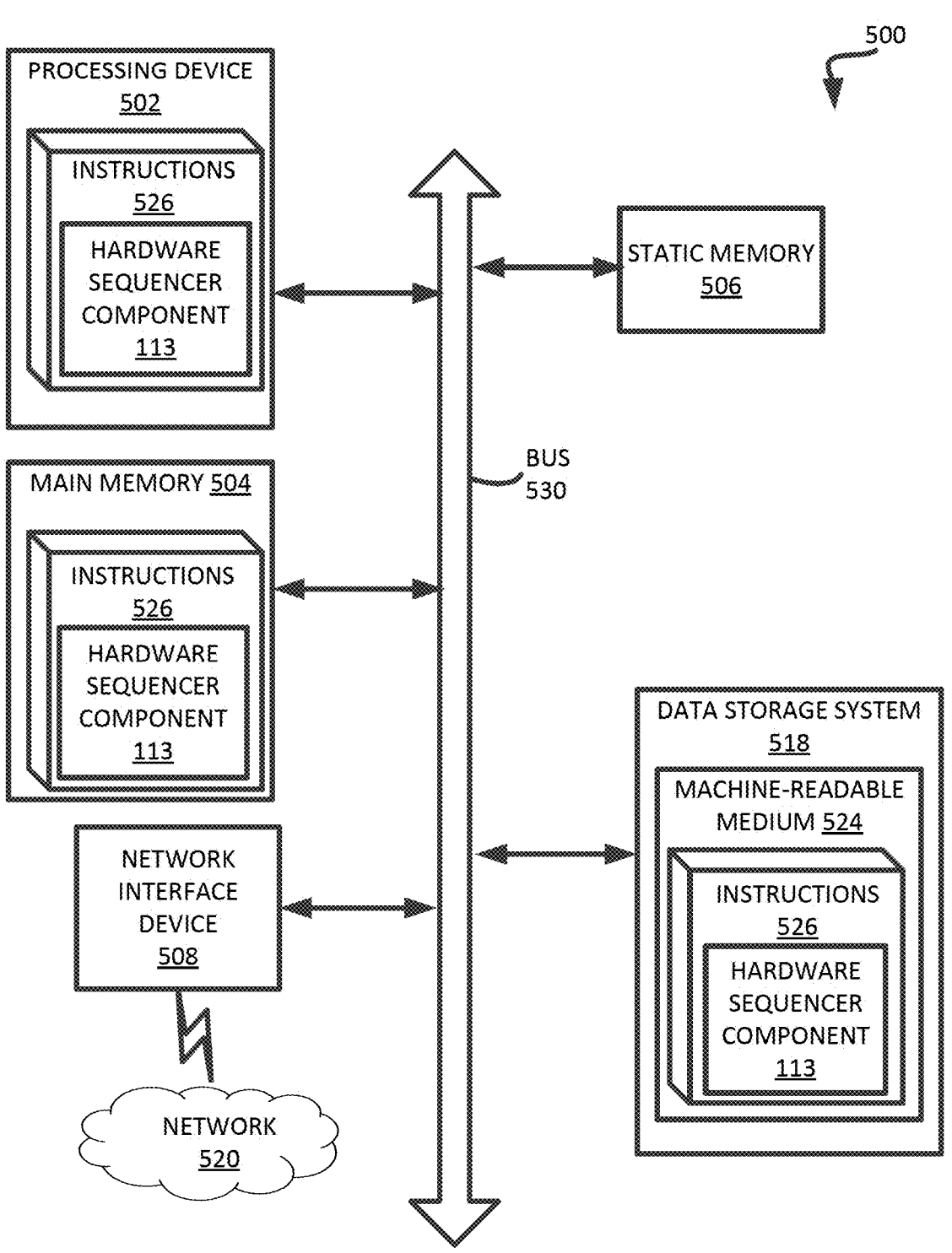
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the hardware sequencer component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a hardware sequencer component 113 (e.g., the hardware sequencer component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMS, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:
a memory device;
a hardware sequencer comprising a plurality of sequencer registers;
a processing device, operatively coupled with the memory device, to perform operations comprising:
    programming a first set of parameter values to a first set of sequencer registers of the plurality of sequencer registers, and a second set of parameter values to a second set of sequencer registers of the plurality of sequencer registers; and
    responsive to detecting a triggering event, the hardware sequencer to perform operations comprising:
        transferring the first set of parameter values from the first set of sequencer registers to a first set of link training registers of a plurality of link training registers of the memory sub-system;
        transferring the second set of parameter values from the second set of sequencer registers to a second set of link training registers of the plurality of link training registers of the memory sub-system; and
initiating one end of a communication link training with a host.

2. The memory sub-system of claim 1, wherein detecting the triggering event comprises:
enabling an auto-release mode of the hardware sequencer, wherein the auto-release mode causes the hardware sequencer to perform operations responsive to a link training request; and
receiving the link training request.

3. The memory sub-system of claim 1, wherein the first set of parameter values comprise values of a physical layer (PHY) parameter, wherein the second set of parameter values comprise values of an equalization settings (EQ) parameter.

4. The memory sub-system of claim 1, wherein the triggering event comprises a request from the host to begin a link training.

5. The memory sub-system of claim 1, wherein the plurality of link training registers are comprised by the hardware sequencer.

6. The memory sub-system of claim 1, comprising:
enabling a configuration mode of the memory sub-system, wherein the configuration mode permits the host to obtain values from the plurality of link training registers.

7. The memory sub-system of claim 6, comprising:
disabling the configuration mode of the memory sub-system; and
enabling an operating mode of the memory sub-system, wherein the operating mode permits the host to enumerate the memory sub-system.

8. The memory sub-system of claim 6, wherein the configuration mode of the memory sub-system comprises a configuration request retry status (CRS) handling mode.

9. The memory sub-system of claim 1, comprising:
receiving a link training interrupt;
performing a peripheral component interconnect express (PCIe) configuration update; and
performing a compute express link (CXL) configuration update.

10. A method comprising:
programming, by a processing device, a first set of parameter values to a first set of sequencer registers of a plurality of sequencer registers of a memory sub-system, and a second set of parameter values to a second set of sequencer registers of the plurality of sequencer registers; and
responsive to detecting a triggering event, performing, by a hardware sequencer operations comprising:
transferring the first set of parameter values from the first set of sequencer registers to a first set of link training registers of a plurality of link training registers of the memory sub-system;
transferring the second set of parameter values from the second set of sequencer registers to a second set of link training registers of the plurality of link training registers of the memory sub-system; and
initiating one end of a communication link training with a host.

11. The method of claim 10, wherein detecting the triggering event comprises:

enabling an auto-release mode of the hardware sequencer, wherein the auto-release mode causes the hardware sequencer to perform operations responsive to a link training request; and
receiving the link training request.

12. The method of claim 10, wherein the first set of parameter values comprise values of a physical layer (PHY) parameter, wherein the second set of parameter values comprise values of an equalization settings (EQ) parameter.

13. The method of claim 10, wherein the triggering event comprises a request from the host to begin a link training.

14. The method of claim 10, wherein the plurality of link training registers are comprised by the hardware sequencer.

15. The method of claim 10, comprising:
enabling a configuration mode of the memory sub-system, wherein the configuration mode permits a host to obtain values from the plurality of link training registers.

16. The method of claim 15, comprising:
disabling the configuration mode of the memory sub-system; and
enabling an operating mode of the memory sub-system, wherein the operating mode permits the host to enumerate the memory sub-system.

17. The method of claim 15, wherein the configuration mode of the memory sub-system comprises a configuration request retry status (CRS) handling mode.

18. The method of claim 10, further comprising:
receiving a link training interrupt;
performing a peripheral component interconnect express (PCIe) configuration update; and
performing a compute express link (CXL) configuration update.

19. A computer-readable non-transitory storage medium comprising executable instructions that, when executed by a controller managing a memory device comprising a plurality of memory cells, cause the controller to:
program a first set of parameter values to a first set of sequencer registers of a plurality of sequencer registers of a memory sub-system, and a second set of parameter values to a second set of sequencer registers of the plurality of sequencer registers; and
responsive to detecting a triggering event, perform, by a hardware sequencer, operations comprising:
transferring the first set of parameter values from the first set of sequencer registers to a first set of link training registers of a plurality of link training registers of the memory sub-system;
transferring the second set of parameter values from the second set of sequencer registers to a second set of link training registers of the plurality of link training registers of the memory sub-system;
enabling a configuration mode of the memory sub-system, wherein the configuration mode permits a host to obtain values from the plurality of link training registers; and
initiating one end of a communication link training with the host.

20. The computer-readable non-transitory storage medium of claim 19 comprising:
enabling an auto-release mode of the hardware sequencer, wherein the auto-release mode causes the hardware sequencer to perform operations responsive to a link training request; and
receiving the link training request.

* * * * *